United States Patent [19]

Michaelson

[11] 4,347,231

[45] Aug. 31, 1982

[54] PREPARATION OF HYDROGEN PEROXIDE FROM ITS ELEMENTS

[75] Inventor: Robert C. Michaelson, Waldwick, N.J.

[73] Assignee: FMC Corporation, Philadelphia, Pa.

[21] Appl. No.: 274,575

[22] Filed: Jun. 17, 1981

[51] Int. Cl.³ .............................................. C01B 15/02
[52] U.S. Cl. .................................................... 423/584
[58] Field of Search ........................................ 423/584

[56] References Cited

U.S. PATENT DOCUMENTS

| | | | |
|---|---|---|---|
| 3,336,112 | 8/1967 | Hooper | 423/584 |
| 3,361,533 | 1/1968 | Hooper | 423/584 |
| 3,433,582 | 3/1969 | Campbell | 423/281 |
| 4,007,256 | 2/1977 | Kim et al. | 423/584 |
| 4,009,252 | 2/1977 | Izumi et al. | 423/584 |
| 4,128,627 | 12/1978 | Dyer et al. | 423/584 |
| 4,207,305 | 6/1980 | Diamond et al. | 423/584 |

FOREIGN PATENT DOCUMENTS 1094804 12/1967 United Kingdom .

OTHER PUBLICATIONS

Vaska et al., J. Am. Chem. Soc. 93, 7099–7101 (1971).
Vaska, Science 140, 809–810 (1963).

*Primary Examiner*—Earl C. Thomas
*Assistant Examiner*—Wayne A. Langel
*Attorney, Agent, or Firm*—Richard E. Elden; Christopher Egolf

[57] ABSTRACT

Hydrogen peroxide is prepared by the homogeneously catalyzed reaction of hydrogen and oxygen in an inert organic solvent, by employing an iridium complex as the catalyst in the presence of a quinone reaction promoter.

11 Claims, No Drawings

PREPARATION OF HYDROGEN PEROXIDE FROM ITS ELEMENTS

BACKGROUND OF THE INVENTION

1. Field of the Invention

This invention relates to a process for preparing hydrogen peroxide from the homogeneously catalyzed reaction of hydrogen and oxygen.

2. Description of the Prior Art

Several methods are presently used to manufacture hydrogen peroxide on a commercial scale: (i) electrolysis of sulfate-containing solutions (e.g., ammonium bisulfate) to form persulfate which is hydrolyzed to recover the sulfate and produce hydrogen peroxide; (ii) oxidation of isopropyl alcohol to yield byproduct acetone and hydrogen peroxide; and (iii) autooxidation of anthraquinone to yield hydrogen peroxide. Disadvantages of these methods include the energy intensive nature of electrolysis processes, and the significant capital and raw material costs associated with the chemical processes.

As an alternative to these techniques, the direct chemical reaction of hydrogen and oxygen to form hydrogen peroxide has been investigated by a number of researchers.

U.S. Pat. No. 4,128,627 issued to Dyer et al discloses a homogeneous catalysis process for synthesizing hydrogen peroxide from hydrogen and oxygen, utilizing a water-insoluble catalyst in a two-phase reaction medium. Preferred catalysts in this homogeneous catalysis system are bis(tri(pentafluorophenyl)phosphine) palladium dichloride, bis(tricyclohexylphosphine) palladium dichloride and bis(triphenylarsine) palladium dichloride.

Processes for preparing hydrogen peroxide from its elements utilizing heterogeneous catalysis systems are disclosed in U.S. Pat. Nos. 4,009,252 issued to Izumi et al; U.S. Pat. No. 4,007,256 issued to Kim et al; U.S. Pat. No. 3,361,533 and U.S. Pat. No. 3,336,122 both issued to Hooper; U.S. Pat. No. 3,433,582 issued to Campbell and British Pat. No. 1,094,804 issued to Campbell.

None of these proposed direct synthesis methods, however, is known to have proven sufficiently efficient and satisfactory for preparing hydrogen peroxide on a commercial basis.

Catalysis systems for the preparation of hydrogen peroxide which employ homogeneous catalysis, i.e., catalyst dissolved in the reaction solvent, are preferred over heterogeneous catalysis i.e., solid phase catalyst, systems. Characteristics of homogeneous catalysis systems are generally mild reaction conditions (less energy intensive), high selectivity based on reactants (minimum reactant costs) and relatively high yields.

Despite such advantages, many prior art transition metal homogeneous catalysts suffer from drawbacks that are a deterent to their commercial use. These adverse characteristics include poor catalyst stability under reaction conditions, limited catalyst solubility in the reaction medium, and low reaction rates for the production of hydrogen peroxide.

The homogeneous catalysts of the present invention are intended to minimize the negative characteristics ordinarily associated with homogeneous catalysis systems.

The method of the present invention utilizes an iridium complex as a homogeneous catalyst, in conjunction with a promoter, to produce hydrogen peroxide. Vaska et al, in *Science* 93, 7099 (1971), reported that such iridium complexes were among several transition metal complexes which catalytically formed water from molecular hydrogen and oxygen under ambient conditions but did not yield hydrogen peroxide as a byproduct.

SUMMARY OF THE INVENTION

In accordance with the present invention, hydrogen peroxide is produced by the catalyzed reaction of hydrogen and oxygen by contacting gaseous hydrogen and oxygen with a two phase homogeneous catalysis system, which contains (i) an inert organic solvent phase having dissolved therein an iridium complex homogeneous catalyst and a quinone-derivative reaction promoter, and (ii) an aqueous solution as the second phase, for sufficient time to form hydrogen peroxide; extracting the hydrogen peroxide reaction product from the organic phase into the aqueous phase; and recovering the aqueous phase containing hydrogen peroxide. The iridium complex homogeneous catalyst has the formula $IrClCO(XR_3)_2$, wherein X is selected from the group of elements consisting of P, As, and Sb and wherein R is selected from the group consisting of phenyl, alkyl radicals having 2–6 carbon atoms, and cyclohexyl radicals.

The catalyst is preferably an iridium complex with a phosphine ligand, preferably triphenylphosphine. The quinone-derivative reaction promoter is desirably a substituted or unsubstituted hydroquinone or quinone, preferably benzoquinone or p-methoxy phenol.

DETAILED DESCRIPTION

The iridium complex catalysts employed in this invention have the general formula $IrClCO(XR_3)_2$, wherein the ligand $XR_3$ is characterized as follows. The ligand $XR_3$ may be a phosphine (P), arsine (As) or stibine (Sb), in which R is a phenyl, an alkyl radical containing 2–6 carbon atoms, preferably ethyl, or a cyclohexyl radical.

The preferred iridium complex catalysts are those having phosphine ligands, including chlorocarbonyl-bis-(triphenylphosphine) iridium, chlorocarbonyl-bis-(triethylphosphine) iridium, and chlorocarbonyl-bis-(tricyclohexylphosphine) iridium.

Concentration of the catalysts employed in the inert organic solvent in this invention may range from as low as about $5.0 \times 10^{-5}$ M (gram moles catalyst/liter of organic solvent) up to a saturation concentration in the organic solvent. The catalyst is preferably present in the organic solvent at concentrations $0.1 \times 10^{-3}$ M up to saturation and most preferably, $0.5 \times 10^{-3}$ M to $2.5 \times 10^{-3}$ M.

The use of a quinone-type reaction promoter is essential to the present invention, inasmuch as the promoter ensures that the desired catalytic activity is obtained with the iridium complex. The quinone-type reaction promoters include quinone and hydroquinone, which may be substituted or unsubstituted. Particularly preferred reaction promoters include benzoquinone, $C_6H_4O_2$, and 2,6-tert-butyl-4-methylphenol, p-methoxyphenol, $CH_3OC_6H_4OH$.

The amount of reaction promoter employed is not critical. The promoter is desirably utilized in a molar concentration which is at least equal to that of the catalyst contained in the organic solvent. Preferably, the promoter is present in an amount equivalent to the molar concentration of catalyst up to about a 25-fold molar excess.

The preferred iridium catalysts and quinone reaction promoters, when utilized in the homogeneous catalysis system of this invention, are capable of producing hydrogen peroxide concentrations of over 1.1 wt % $H_2O_2$ in the aqueous phase of a two phase (inert organic solvent mixed with water) system.

The reaction is desirably performed by employing a two-phase reaction medium which consists of an organic solvent phase and an aqueous phase.

The iridium catalysts of the invention are substantially insoluble in water, so the organic solvent must be capable of dissolving the catalysts and reaction promoter and should also be immiscible with water. The organic solvent must be inert, i.e., non-reactive with hydrogen peroxide under the reaction conditions.

The aqueous phase is employed in the reaction medium to extract the hydrogen peroxide reaction product from the catalyst-containing organic phase, so as to minimize the possibility of catalyst-induced peroxide decomposition. Consequently, the organic solvent should have a distribution coefficient with respect to hydrogen peroxide that favors the removal of hydrogen peroxide from the organic phase to the aqueous phase, thus enhancing the aqueous extraction of hydrogen peroxide. Additives to promote the distribution of hydrogen peroxide to the aqueous phase may be present in the aqueous phase but are not necessary.

Preferred organic solvents include toluene, acetonitrile, xylene, and chlorinated solvents like dichloromethane, chlorobenzene, and dichlorobenzene; toluene and acetonitrile are most preferred.

The ratio of the organic solvent phase to aqueous phase is not critical; it may range from about 1:9 to 9:1 by volume. Volume ratios of solvent phase: aqueous phase in excess of 1:1 are preferred, the ratio being selected so as to maximize hydrogen peroxide concentration in the aqueous phase without significantly reducing the total amount of peroxide produced.

The two phases should be maintained in good contact during the reaction. This may be accomplished via mechanical agitation or, more preferably, by bubbling or similarly contacting the gaseous hydrogen and oxygen reactants with the two liquid phases. Upon completion of the reaction the two liquid phases may simply be allowed to separate, and the $H_2O_2$-containing aqueous phase readily recovered.

The gaseous reactants, hydrogen and oxygen, may be employed as pure gases or mixed with other gases that are inert with respect to the peroxide reaction. The oxygen, for example, may be supplied as air or other inert diluent or carrier gases may also be used.

The volumetric ratio of hydrogen to oxygen in the gaseous atmosphere in contact with the catalyst-containing inert organic solvent may vary within wide limits. Equimolar amounts of hydrogen and oxygen give satisfactory results. However, an oxygen-rich atmosphere may be desirable under some circumstances for minimizing adverse side reactions, such as reduction of the hydrogen peroxide product to water. Since hydrogen is generally less soluble in organic solvents than oxygen, a hydrogen-rich atmosphere may be advantageous so that essentially all oxygen is absorbed, permitting recycle of a substantially pure hydrogen atmosphere.

For obvious reasons, mixtures of hydrogen and oxygen which are outside of the explosive region for $H_2-O_2$ mixtures are clearly desirable.

The temperature at which the hydrogen peroxide reaction is carried out may range from the freezing point of the aqueous phase up to 35° C. or above. Temperatures of about 0° C. to 25° C. are preferred. The lower temperatures, 0° C. or less, enhance catalyst stability, albeit at the expense of a slow reaction rate of peroxide formation. Temperatures above 35° C. provide rapid formation of hydrogen peroxide but catalyst activity may be short-lived.

The reaction process is desirably performed at superatmospheric pressure, up to about 25,000 kPa. Moderate pressures of about 500 to 3500 kPa (50–500 psig) are preferred. Higher pressures would be anticipated to provide an increased rate of formation of hydrogen peroxide in the reaction medium, but such higher pressures are more difficult and expensive to maintain on a commercial scale.

Reaction times may range from a few minutes to several hours. Preferred reaction times are from 0.25 hour to 24 hours. The optimal choice of reaction time employed is typically dependent, in part, on the reaction temperature and particular catalyst utilized, since both the rate of hydrogen peroxide formation and catalyst stability are affected by reaction temperature.

Catalyst Preparation

The iridium complexes employed as catalysts in the process of this invention may be synthesized by the following route:

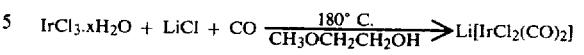

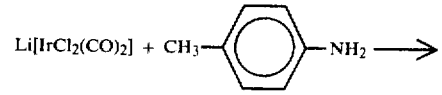

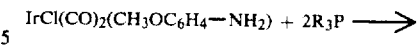

A preferred catalyst, chlorocarbonyl-bis-(triphenylphosphine) iridium, was prepared by first synthesizing an intermediate, chloro-dicarbonyl-iridium(1)-p-toluide.

Carbon monoxide at 40 psig was added to a solution of 3.50 g (11.7 mmol) of iridium trichloride hydrate and 1.00 g (23.6 mmol) of lithium chloride in 50 ml of distilled 2-methoxyethanol. The reaction was performed in a glass pressure vessel which had been evacuated, prior to admission of the carbon monoxide, with an oil bath heated to a temperature of 180° C. In two hours the black solution turned yellow in color.

Upon cooling, 1.30 g (12.1 mmol) of p-toluidine was added to the solution under a stream of nitrogen. The solution was stirred for 30 minutes and then poured into 500 ml of distilled water, whereupon it turned purple in color. The precipitate was filtered from the mixture, washed with distilled water, and recrystallized from hot toluene. The purple precipitate was dried under vacuum, yielding 3.34 g (95.4% recovery) of chloro-dicarbonyl-iridium(1)-p-toluide intermediate.

Using the intermediate, chlorocarbonyl-bis-(triphenylphosphine) iridium, also known as Vaska's complex (see L. Vaska, *Science* 140 809 (1963)), was synthesized in the following manner. A solution of 0.31 g (0.79 mmol) of chloro-dicarbonyl-iridium-p-toluide and 0.42 g (1.60 mmol) of triphenylphosphine in 25 ml of distilled toluene was stirred under a nitrogen atmosphere (using Schlenk techniques) for 3 hours. Cold pentane was added to precipitate the catalyst complex. The mixture was filtered and the yellow precipitate was dried, yielding 0.34 g (100% recovery) of chlorocarbonyl-bis-(triphenylphosphine) iridium which had a melting point of about 220°–225° C.

Another preferred catalyst, chlorocarbonyl-bis-(triethylphosphine) iridium, was prepared in an analogous manner by substituting triethylphosphine for the triphenylphosphine in the above-noted preparation of Vaska's complex. A solution of 1.40 g (3.58 mmol) of chloro-dicarbonyl-iridium-p-toluide and 0.87 g (7.36 mmol) of triethylphosphine in 25 ml of distilled toluene was stirred under a nitrogen atmosphere (using Schlenk techniques) for 3 hours. An oil-like precipitate separated, and when the entire solution was cooled, a dark brown precipitate crystallized from solution. At room temperature the precipitate became an oil which would not be crystallized. The catalyst compound was therefore utilized in this form.

Still another preferred catalyst, chlorocarbonyl-bis-(tricyclohexylphosphine)-iridium, was prepared by substituting tricyclohexylphosphine for the triphenylphosphine utilized in the above-noted preparation of Vaska's complex. A solution of 0.30 g (0.77 mmol) of chloro-dicarbonyl-iridium-p-toluide and 0.43 g (1.53 mmol) of tricyclohexylphosphine in 25 ml of distilled toluene was stirred under a nitrogen atmosphere (using Schlenk techniques) for 3 hours. Cold pentane was added to the solution which produced a yellow precipitate. The iridium complex was filtered and dried under vacuum, yielding 0.44 g (100% recovery) of chlorocarbonyl-bis-(tricyclohexylphosphine)-iridium.

Catalyst Evaluation Procedure

The iridium complex catalysts employed in the process of this invention were evaluated by the following general procedure. The reaction of hydrogen and oxygen to produce hydrogen peroxide was performed in a 500 ml heavy walled Fisher-Porter glass pressure bottle, which was fitted with a "Christmas tree" head that contained a pressure gauge, inlet system for two gases, a vent or auxiliary inlet, and an O-ring closure to the bottle.

The glass bottle was typically charged with 20 mg of solid iridium complex catalyst, 40 ml of solvent in which the catalyst dissolved and about $4 \times 10^{-4}$ g-mole of promoter, which also dissolved. The bottle was sealed, and charged with equal parts of hydrogen and oxygen gas to a total pressure of 150 psig (1034 kPa).

The contents of the pressure bottle were vigorously agitated via a magnetic stirrer bar present in the bottle. Temperature of the bottle contents was controlled via ice bath and maintained at about 0° C.

After the desired reaction time had elapsed, the glass bottle was vented to the atmosphere and its contents analyzed for hydrogen peroxide (by permanganate or ceric sulfate titration).

EXAMPLE 1

Chlorocarbonyl-bis-triphenylphosphine iridium (20 mg; $2.56 \times 10^{-2}$ mmole) and benzoquinone promoter (60 mg; 0.56 mmole) were dissolved in 40 ml of toluene contained in a glass pressure bottle. The bottle was pressurized to 150 psig with equal volumes of hydrogen and oxygen gas. The sealed pressure bottle was maintained at a temperature of 0° C., and the contents vigorously agitated for two hours.

The pressure bottle was then allowed to warm to ambient temperature, vented, and its contents analyzed for hydrogen peroxide via potassium permanganate titration. The solvent was found to contain 1.15 wt % $H_2O_2$, a total of 399.8 mg $H_2O_2$ (11.76 mmoles) having been formed.

EXAMPLE 2

The procedure of Example 1 was duplicated, except that p-methoxyphenol promoter, in a smaller amount (0.04 mmole), was substituted for the benzoquinone promoter. After the pressure bottle contents had been agitated for 1 hour, the bottle was vented and the contents analyzed for hydrogen peroxide. The reaction mixture was analyzed and the toluene was found to contain 0.69 wt % $H_2O_2$.

COMPARATIVE EXAMPLE A

No quinone or phenol promoter was used in this comparative example, which otherwise utilized a procedure identical to that of Example 1.

Chlorocarbonyl-bis-triphenylphosphine iridium (20 mg; 0.026 mmol) was dissolved in 40 ml of toluene contained in a glass pressure bottle. The bottle was then pressurized to 150 psig with equal volumes of hydrogen and oxygen gas. The sealed pressure bottle was maintained at a temperature of 0° C., and the contents vigorously agitated for two hours.

The pressure bottle was then vented, and its contents analyzed for hydrogen peroxide: none was found.

I claim:

1. In a process for producing hydrogen peroxide by the catalyzed reaction of hydrogen and oxygen, the improvement which comprises contacting gaseous hydrogen and oxygen with a two phase homogeneous catalysis system, which contains (i) an inert organic solvent having dissolved therein an iridium complex homogeneous catalyst and a quinone-derivative reaction promoter, which catalyst has the formula IrClCO(XR$_3$)$_2$ wherein X is selected from the group of elements consisting of P, As, and Sb and wherein R is selected from the group consisting of phenyl, alkyl radicals having 2 to 6 carbon atoms, and cyclohexyl radicals, and (ii) an aqueous solution as the second phase, for sufficient time to form hydrogen peroxide; extracting hydrogen peroxide reaction product from the organic phase into the aqueous phase; and recovering the aqueous phase containing hydrogen peroxide.

2. The process of claim 1 wherein the iridium complex homogeneous catalyst has the formula IrClCO(PR$_3$)$_2$ wherein R is selected from the group consisting of phenyl, alkyl radicals having 2 to 6 carbon atoms, and cyclohexyl radicals.

3. The method of claim 1 wherein the catalyst is selected from the group consisting of chlorocarbonyl-bis-(triphenylphosphine) iridium, chlorocarbonyl-bis-(triethylphosphine) iridium, and chlorocarbonyl-bis-(tricyclohexylphosphine) iridium.

4. The process of claim 1, 2 or 3 wherein the catalyst is employed in amounts of from $1\times 10^{-4}$ gram-moles/liter of solvent up to a saturation concentration in the organic solvent.

5. The process of claim 4 wherein the promoter is employed in a molar amount equal to at least the molar concentration of catalyst in the solvent, up to a 25-fold molar excess.

6. The process of claim 1, 2 or 3 wherein the quinone promoter is a substituted or unsubstituted hydroquinone or quinone.

7. The process of claim 6 wherein the quinone-derivative promoter is benzoquinone or p-methoxyphenol.

8. The process of claim 1, 2 or 3 wherein the relative amounts of organic solvent and aqueous phase are such as to provide a volume ratio of from 1:9 to 9:1.

9. The process of claim 1, 2 or 3 wherein the inert organic solvent is selected from the group consisting of acetonitrile and toluene.

10. The process of claim 1, 2 or 3 wherein the reaction is carried out at a temperature of from 0° to 35° C.

11. The process of claim 1, 2 or 3 wherein the reaction time is from 0.25 to 24 hours.

* * * * *